April 25, 1933.  G. EATON  1,905,452
ELECTRIC PLUG
Filed May 9, 1929

INVENTOR
George Eaton
Milburn and Milburn
ATTORNEYS

Patented Apr. 25, 1933

1,905,452

UNITED STATES PATENT OFFICE

GEORGE EATON, OF CLEVELAND, OHIO, ASSIGNOR TO MAY C. EATON

ELECTRIC PLUG

Application filed May 9, 1929. Serial No. 361,628.

This invention relates to an improved form of electric plug for toasters or the like.

As is well known to those who are familiar with the present art, the electric plugs are provided with such firm means of attachment to the binding posts upon the electric toasters or other electrical appliances that considerable difficulty is experienced in attaching the plug thereto or removing the same therefrom without holding the toaster or other such appliance with the one hand while manipulating the plug with the other hand. This is not objectionable when the frame of the toaster is cold, but it is decidedly objectionable and practically impossible to hold a toaster with the bare hand when it is in highly heated condition. Switches have been employed as a means of turning the current off and on, but such an arrangement is quite costly and in any event, it still becomes necessary to employ the one hand as a means of steadying the toaster or other such appliance while manipulating the plug with the other hand, and the same objection exists in case the frame of the toaster should be too hot for comfortable holding with the bare hand.

It is therefore the object of the present invention to devise a form of electric plug which can be readily attached to and detached from the binding posts of the electric toaster or other such appliance by merely manipulating the plug with the one hand and without having to touch the frame of the toaster itself.

A further object is to devise such an attachment which can be embodied as a part of the electric plug and which is electrically insulated.

More specifically, it is the object of this invention to devise a hand-manipulated attachment for the electric plug which is adapted to open the electric connecting means of the plug so as to permit the same to be readily attached to or detached from the binding posts of the toaster or other such appliance.

Other objects will appear from the following description and claims when considered together with the accompanying drawing.

Figure 1:
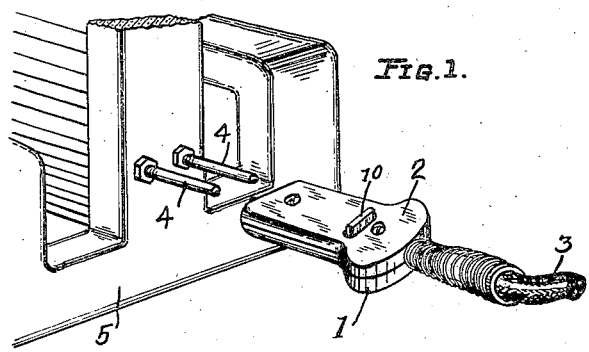
Figure 3:
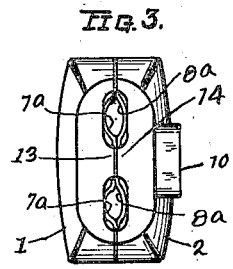
Figure 2:
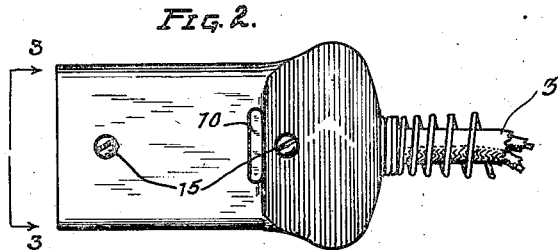
Figure 7:
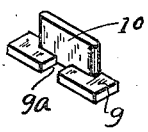
Figure 4:
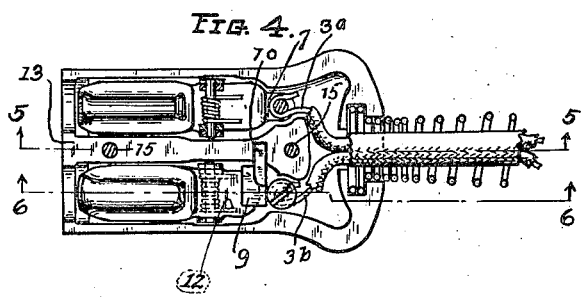
Figure 5:
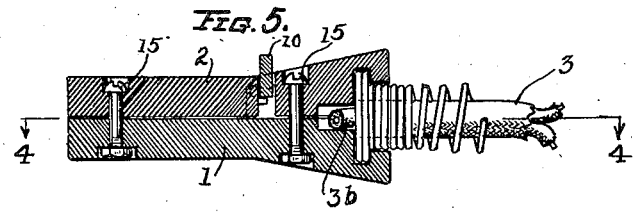
Figure 6:
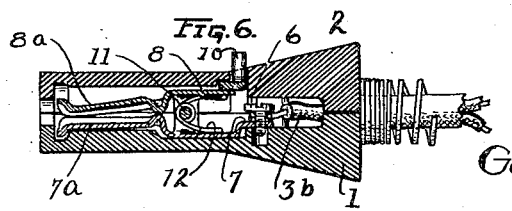

Fig. 1 is a perspective view illustrating the application of the present invention to an electric toaster; Fig. 2 is a top plan view of the improved form of electric plug; Fig. 3 is an end view of the same according to line 3—3 of Fig. 2; Fig. 4 is a view taken on line 4—4 of Fig. 5; Figs. 5 and 6 are sectional views taken on lines 5—5 and 6—6, respectively, of Fig. 4; and Fig. 7 is a perspective view of the presser member.

The casing of the electric plug comprises the half-sections 1 and 2 of an electric insulating material within which are enclosed the electric connecting means for establishing electric contact between the wires of the electric cord 3 and the binding posts 4 upon the electric toaster which is partially indicated by reference numeral 5. The separate wires $3^a$ and $3^b$ of the cord are attached by means of the screws 6 to the rear ends of the spring contact members which are adapted to engage the binding posts 4. As indicated in the drawing, especially in Fig. 6, the screws 6 are threaded into the rear end portions 7 of the lower part of the spring-engaging member, while the rear end portion of the upper part 8 of the spring engaging member is adapted to be engaged by the lower part 9 of the presser or button member 10 which extends through an opening in the casing member 2, this outer portion 10 being adapted for pressing engagement by the finger of the operator. The spring engaging members are in each case pivotally mounted at the point 11 and are normally forced into closed position by means of the spring 12 so as to effect closing of the circuit by engagement of the binding posts 4. The forward portions $7^a$ and $8^a$ of the spring engaging members normally occupy closed position and are opened by depression of the presser member 10. The spring engaging members rest in the seats or depressions which are formed in the casing member 1 upon the opposite sides of the middle portion 13. Likewise, the casing member 2 is provided with cut-out portions so as to accommodate the spring engaging members when the two parts of the casing are secured together. The portion 2 of the casing is also provided with a middle portion 14, and the bolts 15 extend through the portions 13 and 14 as a means of securing together the two halves 1 and 2 of the insulated casing. The casing is composed entirely of electric insulating material as is also the presser member. The presser member is also formed as one-piece and is provided with the cut-out portion 9ª for sliding engagement with the rear end portion of the longitudinally extending middle portion 13. In this way, the presser member 10 is insured of straight-line movement so as to properly engage the two spring engaging members for simultaneously opening the same. As indicated in the drawing, the lever arm 8 is made sufficiently long so as to afford sufficient leverage for the opening of the spring-engaging members without requiring undue pressure upon the presser member. At the same time, the screws 6 are arranged at a point sufficiently to the rear so that their position will not interfere with the downward movement of the presser member upon releasing the spring-engaging members.

Except for the novel features herein set forth, the casing is of substantially the same construction and the parts associated therewith are connected in substantially the same manner as in the form of plug familiar to those who are acquainted with the present art.

It is to be understood that the present disclosure is merely for purposes of illustration and that there may be effected various modifications of the present invention without departing from the spirit thereof. It is to be understood also that the present invention may be adopted for use in connection with various forms of electrical appliances, and the following claims are intended to cover any and all forms of the present invention which may be adapted for any and all such uses.

With the present invention, the electric plug can be gripped in the one hand of the operator and the presser member 10 can be depressed by the thumb of the same hand so as to open the portions 7ª and 8ª, respectively, which will firmly grip the same upon release of the presser member 10. When it is desired to detach the plug, this may be done by again depressing the member 10 and without requiring the toaster to be steadied by the other hand of the operator as would be otherwise necessary because of the firm gripping engagement of the plug with the binding posts.

Thus I have provided a device which is not costly to manufacture and which greatly facilitates the attaching and detaching operations of the electric plug. Furthermore, such improved form of plug is completely insulated and therefore possesses the highest degree of safety.

Other advantages will be apparent to those who are skilled in the art to which the present invention relates.

What I claim is:

1. An electric plug for an electric toaster or the like, comprising an electric insulated casing, a plurality of resiliently engaging contact means enclosed within said casing and normally tending towards closed position for establishing electric connection, said contact means each including a pair of pivotally connected members having electric terminal engaging jaws at the one end and having rearwardly extending arms at the other end, one of said arms in each case having means for connection to an electric supply line, and the other of said arms in each case being constructed and arranged to serve as a lever means for actuating the contact means for opening the same, and a single member extending through the casing so as to be operatable from the outside thereof and adapted for transverse straight-line movement for operative engagement with all of said lever means for simultaneously spreading the same whereby said plug can be readily attached to or released from engagement with the terminal means upon an electric toaster or the like.

2. An electric plug for an electric toaster or the like, comprising an electric insulated casing, resiliently engaging contact means enclosed within said casing and normally tending to establish connection to electrical terminal means upon the electric toaster or the like, release means of electric insulating material extending through said casing, the inner part of said release means having integral portions for maintaining the same in assembly and for engagement with said contact means for releasing the same, and the outer part of said release means being adapted for depression by the hand of the user for releasing the contact means.

3. An electric plug for an electric toaster or the like, comprising an electric insulated casing, resiliently engaging contact means enclosed within said casing and normally tending to establish connection to electrical terminal means upon the electric toaster or the like, said casing having an opening through one wall thereof, and a single one-piece release means of electric insulating material having a portion extending out through said opening and adapted for straight-line depression by manipulation from the outside of the casing, said release means having inner enlarged integral portions for maintaining the same in said opening and in operative engagement with said contact means inside the casing, whereby the parts can be readily assembled and the plug can be readily released from engagement with the terminal means.

4. An appliance plug including a chambered insulation body comprising a plurality of sections detachably but rigidly connected together, a terminal prong receiving socket in the body chamber comprising a pair of members yieldingly constrained towards each other for socket formation and prong engagement, and means including a body exposed portion for forcibly separating said members for ready socket reception and removal of the prong.

5. An electric plug for an electric toaster or the like comprising an electric insulated casing, a pair of resiliently engaging contact means enclosed within said casing and normally tending towards closed position for establishing electric connection, said contact means each including a pair of tiltably separable members one having an electric terminal engaging jaw at one end and arranged for electric supply line connection, one of said members being arranged to serve as a lever, means for actuating the contact means for opening same, and a single member extending through the casing so as to be operatable from outside thereof and adapted for transverse straight line movement for simultaneously spreading both contact means whereby said plug can be readily attached to or released from engagement with the terminal means of an electric toaster or the like.

6. An electric plug for an electric toaster or the like comprising an electric insulated casing, a pair of resiliently engaging contact means enclosed within said casing and normally tending towards closed position for establishing electrical connection, said contact means each including a pair of tiltably separable members one having an electric terminal engaging jaw at one end and arranged for electric supply line connection, one of said members being arranged to serve as a lever, means for actuating the contact means for opening same including a pair of diverging members arranged in overlapping relation to a separable member of each of said contact means for simultaneously separating same from the adjacent members whereby the plug can be readily attached to or released from engagement with the terminal means for an electric toaster or the like, and a single member adapted to transverse straight line movement and movable through the casing and having operative engagement with the separable contact members through said diverging members, said transversely movable member being normally constrained outwardly relative to the casing.

In testimony whereof, I hereby affix my signature.

GEORGE EATON.